Figure 6:
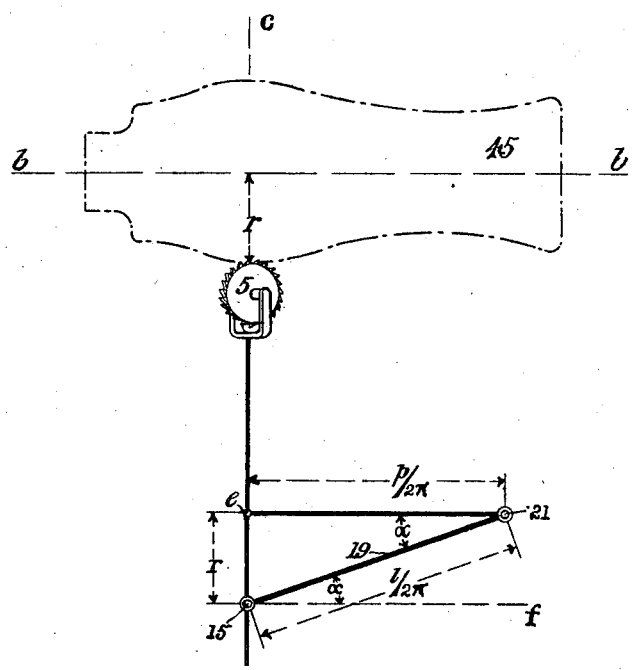

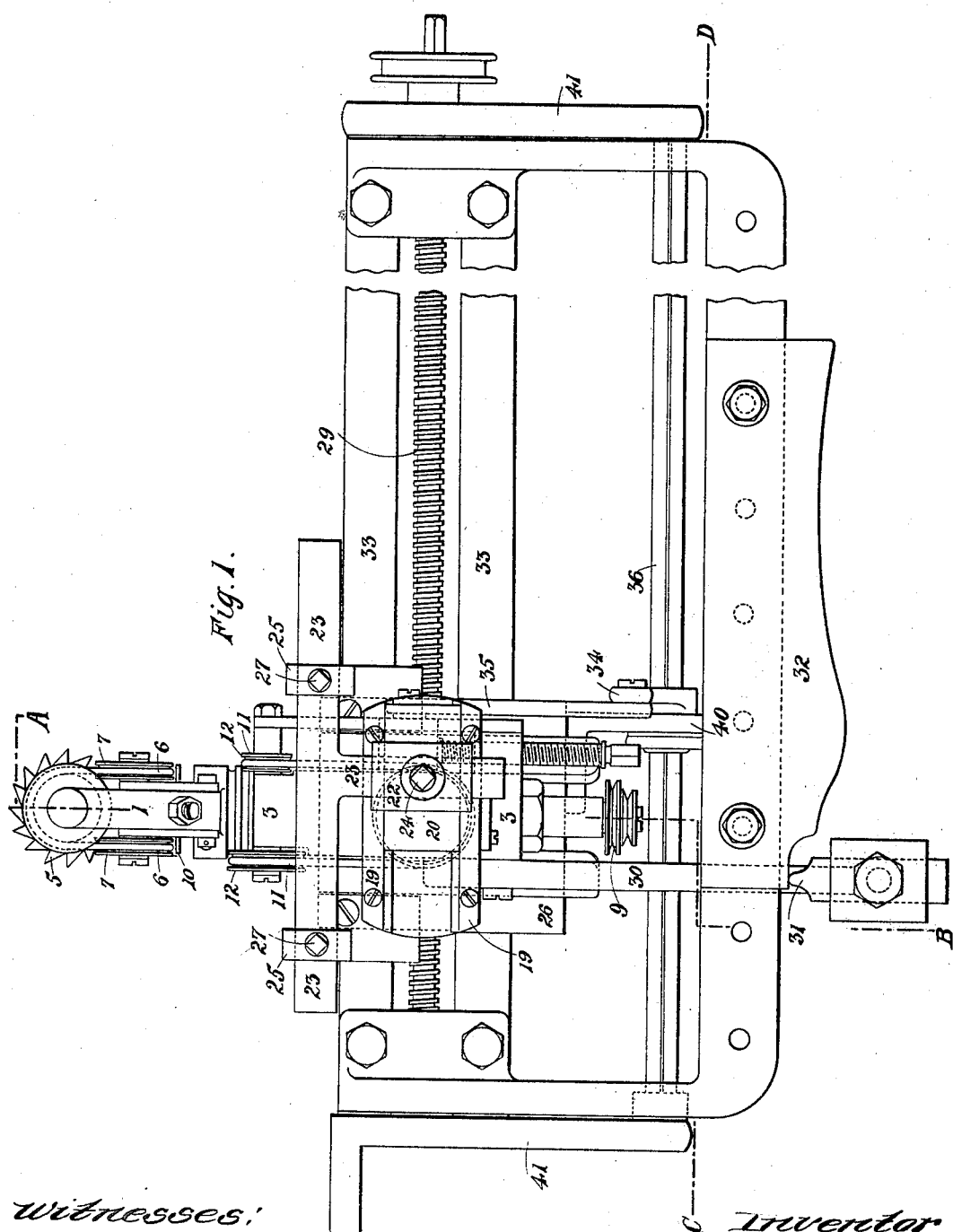

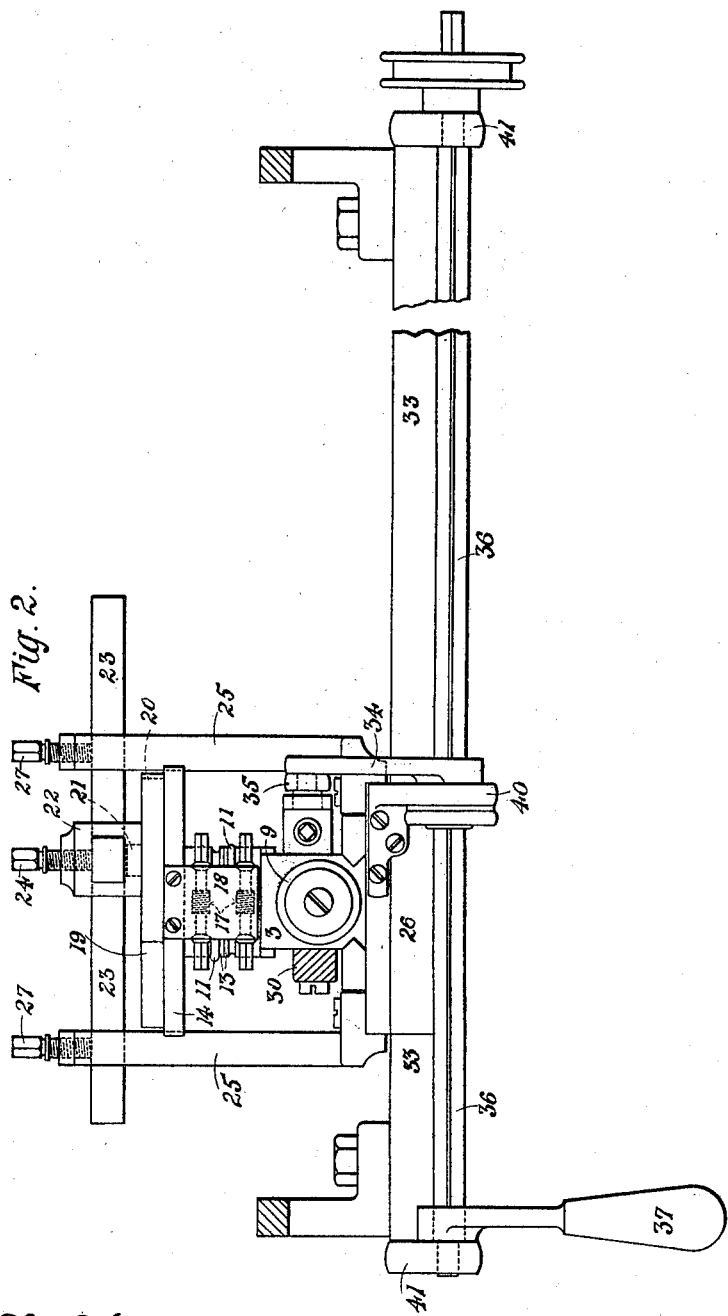

No. 701,225. Patented May 27, 1902.
H. C. ROBINSON.
APPARATUS FOR CUTTING SCREWS OR SPIRALS.
(Application filed May 17, 1901.)
(No Model.) 4 Sheets—Sheet 3.
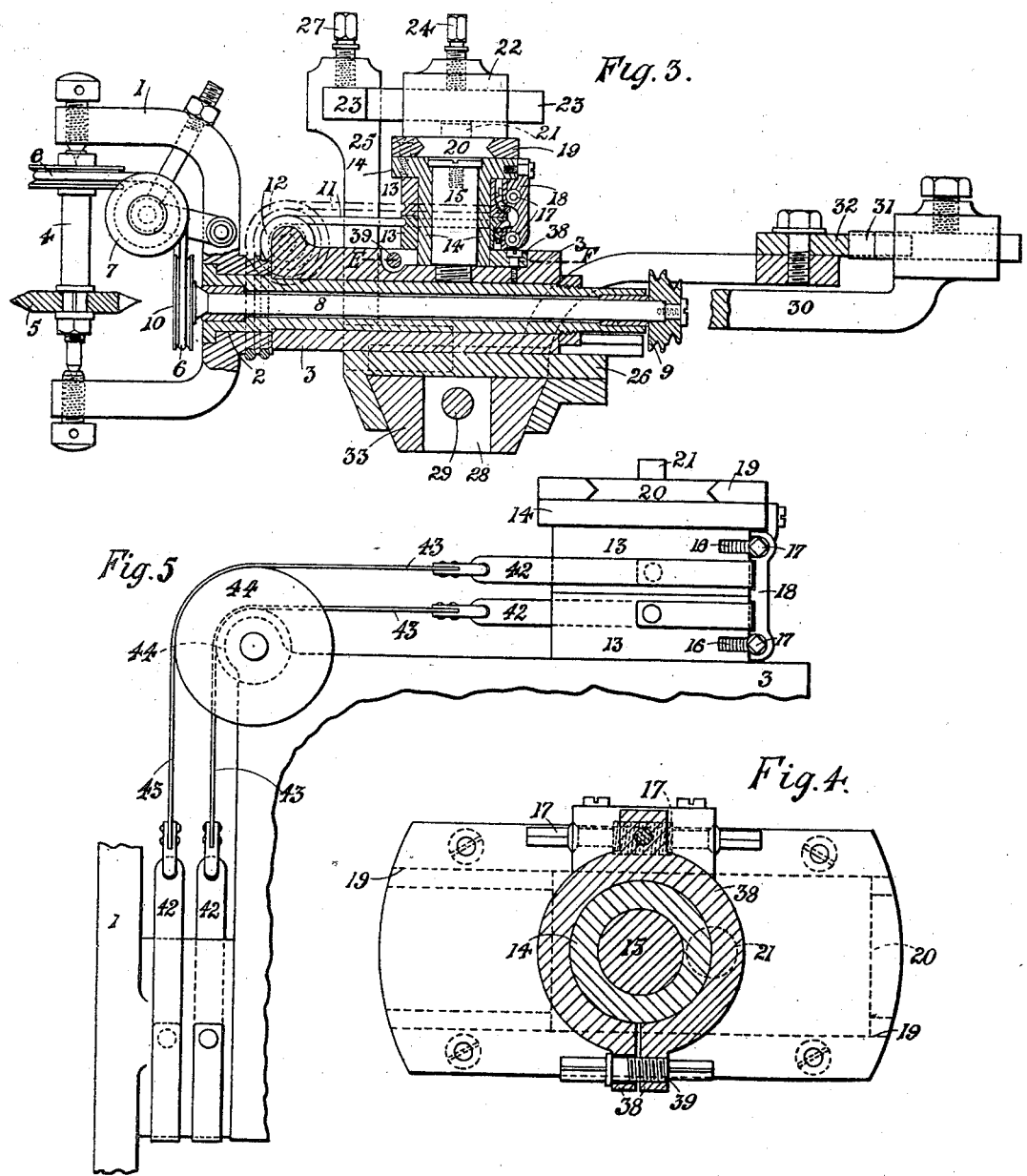
Witnesses:
Dennis Sumby,
Inventor
Hugh C. Robinson
By James L. Norris
Atty No. 701,225.  
H. C. ROBINSON.  
APPARATUS FOR CUTTING SCREWS OR SPIRALS.  
(Application filed May 17, 1901.)  
(No Model.)  
Patented May 27, 1902.  
4 Sheets—Sheet 4.

Witnesses.

Inventor.  
Hugh C. Robinson,  
By James L. Norris  
Att'y.

UNITED STATES PATENT OFFICE.

HUGH CECIL ROBINSON, OF LONDON, ENGLAND.

APPARATUS FOR CUTTING SCREWS OR SPIRALS.

SPECIFICATION forming part of Letters Patent No. 701,225, dated May 27, 1902.

Application filed May 17, 1901. Serial No. 60,771. (No model.)

*To all whom it may concern:*

Be it known that I, HUGH CECIL ROBINSON, a subject of the King of Great Britain, residing at London, England, have invented certain new and useful Improvements in Apparatus for Cutting Screws or Spirals, of which the following is a specification.

In cutting screws or spirals (hereinafter called "spirals") it is necessary for their perfect production that the tool, whether it be a revolving cutter or an ordinary non-rotary tool, shall be placed at a definite angle in relation to the work, which angle is determined by the pitch of the spiral and the diameter of the material on which the spiral is to be cut. There is one angle for each pitch and particular diameter at which the tool can work without cutting away or damaging the side of the spiral as the cutting proceeds.

In cutting spirals on plain cylinders the angle once determined is not altered; but when the work varies in its diameter—*i. e.*, is not cylindrical—the pitch or number of threads per unit length being, however, kept constant, it is necessary in order to cut the spiral correctly that the angular inclination of the tool shall vary with every increase or decrease of the diameter, so as to maintain the plane of the tool parallel to the tangent to the thread at the cutting-point.

My invention is designed to provide means whereby the angle of the tool, whether it be a revolving cutter or an ordinary non-rotary cutting-tool, is automatically varied with every alteration in the diameter of the work upon which the spiral is being cut, so as to maintain the correct angle for the tool, having regard to such diameter at the point where the tool is cutting.

In turning objects of varying diameter or radius the cutter-frame or tool-holder is usually held in a transversely-movable carriage or tool-slide on the slide-rest, and it is clear that the said tool-slide and with it the tool must be made to approach more nearly to the axis about which the work revolves when passing from a larger to a smaller diameter and must recede from the axis when passing from a lesser to a greater diameter. By my invention I take advantage of this transverse movement of the tool-slide on the slide-rest for the purpose of obtaining the required variation of the angle of the tool.

According to my said invention the cutter-frame or tool-holder is rotatably mounted on or in the said tool-slide or transversely-movable carriage of the slide-rest and is connected through suitable belt or other gearing to a guide-frame with a slider, forming a lever, which guide-frame is pivotally mounted on the said tool-slide. The slider is furnished with a pivot-pin, which is connected to adjusting mechanism mounted on the saddle of the slide-rest and which can be set at any desired distance from the locus or path of the axis of oscillation of the said lever in the movement of the said tool-slide toward and away from the work. By these means as the tool-slide is moved in and out the said lever will be oscillated and the cutter-frame or tool-holder will thereby be turned through a corresponding angle, the amount of such rotation being dependent on the perpendicular distance of the said pivot-pin from the locus or path of the axis of oscillation of the said lever. I also provide means comprising a split collar with clamping-screw for locking the cutter-frame or tool-holder at any desired angle, this being advantageous in cases where automatic adjustment of the angle of the cutter or tool is not required.

In the accompanying drawings I have shown how my said invention can be conveniently and advantageously carried into practice.

Figure 1 is a plan of my improved apparatus in which a rotary cutter is employed. Fig. 2 is a sectional front elevation on the line C D, Fig. 1. Fig. 3 is a section on the line A B, Fig. 1. Fig. 4 is a section on the line E F, Fig. 3, drawn to a larger scale, illustrating a detail of construction. Fig. 5 is a partial side elevation illustrating a modified form of transmission-gearing for connecting the cutter-frame and the oscillating lever on the tool-slide. Fig. 6 is a diagram illustrating the operation of my improved device.

Like figures of reference indicate corresponding parts throughout the drawings.

1 is the cutter-frame, rotatably mounted on one end of a bush or stem 2, secured in the transversely-movable tool-slide 3. The said frame carries a cutter-spindle 4, on which is mounted a rotary cutter 5, said spindle being driven by a band 6, passing over adjustable guide and tension pulleys 7 from a pulley 10 on the inner end of a shaft 8. This shaft is journaled in the bush 2 and is provided at its outer end with cone-pulleys 9, whereby it can receive motion from any suitable driving cord or belt. By this arrangement the angle of the cutter-spindle can be varied without materially interfering with the tension of the driving-band on the cone 9. The pulley 10 and the driving-band 6 may in some instances be substituted by bevel-gearing.

Around the hub of the cutter-frame 1 are arranged a couple of bands or cords 11, whose ends are fixed to the hub. These bands pass around the hub in opposite directions and extend over guide-pulleys 12 to rings 13, around which they pass in opposite directions and to which their ends are secured. The rings 13 are mounted on a sleeve 14, which turns on a pin 15 on the transversely-movable slide 3, and the said rings are adjustable relatively to the sleeve 14 by means of teeth 16, formed thereon and engaging with tangent screws 17, journaled in a block 18, secured to the said sleeve, so as to enable the bands 11 to be drawn up taut and the frame 1 and sleeve 14 to be connected by transmission-gearing which is free from lost motion.

The sleeve 14 is provided at the top with a double lever-arm in the form of a guide-frame 19, and in this frame there moves a slider 20, which is connected by means of a pivot-pin 21 to a block 22. This block is adapted to slide over the stem of a T-piece 23 and can be secured in any desired position thereon by means of a set-screw 24. The cross-arms of the T-piece are supported parallel to the axis of the lathe-mandrel and of the work in suitable sockets in two uprights 25, fixed on the longitudinally-movable carriage or saddle 26 and are capable of being secured in any desired position by the set-screws 27. The said cross-arms of the T-piece may be graduated to facilitate the setting of the said T-piece in any desired position.

The motions of the slides or carriages 3 and 26 are obtained, for example, as follows: The saddle 26 is provided with a nut 28, engaging with a leading-screw 29, which can be rotated in any suitable known manner. The tool-slide 3 is provided with an arm 30, having an adjustable projection 31, adapted to engage with a templet 32, secured to a bracket carried by the frame of the slide-rest 33. The projection 31 is held in contact with the templet 32 by means of a lever 34, rotatably mounted in a bracket 40 on the saddle 26 and connected to the slide 3 by a link 35. The hub of the lever 34 fits over and slides easily along a square or like shaft 36, provided with a handle 37 and turning in bearings 41 41 on the frame of the slide-rest 33, so that by operating the handle 37 the projection 31 will be kept up to the templet 32.

Around the lower part of the sleeve 14 is arranged a split collar 38, which is anchored to the slide 3 and is provided with a clamping-screw 39, whereby it can be contracted so as to hold fast the sleeve 14, and therefore also the frame 1, against rotation when it is desired to use the tool at a fixed angle.

The setting of my improved apparatus is effected as follows: The clamping-screws 27 and 24 having been loosened, the T-piece is adjusted in the sockets of the uprights 25, so as to make the distance between the axes of the sleeve 14—i. e., of the lever 19—and of the pivot-pin 21 when the lever 19 is parallel to the line joining the lathe-centers equal to the pitch of the spiral to be cut divided by 6.28318 ($2\pi$). This setting can be facilitated by having the T-piece graduated. The set-screws 27 are then tightened up.

To ascertain the correct position for the pivot-pin 21, the cutting-tool or revolving cutter is turned to the correct angle to suit the angle of the spiral having regard to the diameter of the work at the particular part where the cutter is at the moment situated. This movement will be transmitted through the cords 11, sleeve 14, guide frame or lever 19, slider 20, and pivot-pin 21 to the block 22, thus bringing the said block 22 into the proper position, in which it is then fixed by the clamping-screw 24, or the correct position of the pivot-pin 21 may be ascertained by arranging the lever 19 parallel to the axis of the work and then moving the slide 3 inward until the edge of the cutter is in line with the lathe-centers. The screw 24 is then tightened and the apparatus is set. On drawing back the slide 3 from this position the arm 19 will be turned through an angle equal to that through which the tool is required to turn to maintain its parallelism with the inclination of the spiral, and while at work the angle of the cutting-tool or revolving cutter will be automatically varied as the tool-slide is moved toward and away from the axis of the work in strict agreement with the variations in the angle of the spiral being cut. The principle on which this adjustment is based may be illustrated with reference to Fig. 6, in which 45 is the work, $r$ the radius of the work at the cutting-point, $l$ the instantaneous value of the length (measured on the periphery) of one convolution of the thread corresponding to the radius $r$ at the cutting-point, and $p$ the pitch expressed as the axial length of one convolution of the thread, this last quantity being a constant for a given piece of work. Moreover, the angle which the guide frame or lever 19 makes with the line $b\ b$ joining the lathe-centers or with the lines $e\ 21$ and $15\ f$ parallel thereto is equal or proportional to the angle which the plane of the cutter 5 makes with the horizontal. It will be seen that when the radius of the work is zero these angles will be zero, and the instantaneous length $l$ of one convolution of the thread will be equal to $p$; but when the radius of the work is $r$ the cutter 5 and pivot-pin 15 will be moved back along the line $c\ c$ through the distance $r$, the lever 19 turned through an angle $x$, and the cutter 5 turned through an angle equal or proportional thereto, so as to correspond with the increased instantaneous length of one convolution of the thread. Assuming the corresponding angle through which the cutter has turned to be equal to $x$, this increased instantaneous length will be $$l=\sqrt{(2\pi r)_2+p^2},$$

so that in order to obtain the required automatic adjustment of angle of the plane of the cutter the distance $e$ 21 of the axis of the pivot-pin 21 from the line $c\ c$ or locus of the pivot-pin 15 must be in the ratio of $\frac{p}{2\pi r}$ to the distance $e$ 15 of the axis of the pivot-pin 15 from the foot of the perpendicular from 21 onto the line $c\ c$. From this it follows that when the line $e$ 15 is equal to $r$ the line $e$ 21 must be equal to $p$ divided by $2\pi$.

In the modification shown in Fig. 5 the cords 11 are replaced by bands 42 of steel or other suitable material, united by connecting-bands 43, which pass around guide-pulleys 44. This gear affords great strength, while at the same time retaining the requisite flexibility, and is suitable for use on lathes for heavy work.

What I claim is—

1. The combination of a slide-rest, a cutter or tool frame and a lever both pivotally mounted on the transverse slide of said slide-rest, gearing connecting said cutter or tool frame and said lever so that one cannot turn without the other, and means pivotally and adjustably connecting said lever to the longitudinal slide of the slide-rest, substantially as, and for the purpose, hereinbefore described.

2. The combination, in a lathe, of a slide-rest, a cutter or tool frame and a guide-frame with a slider forming a lever, both frames pivotally mounted on the transverse slide of said slide-rest, gearing connecting said cutter or tool frame and said guide-frame, an adjustable block carried by the longitudinal slide of said slide-rest, and a pivot-pin connecting said slider and said adjustable block, substantially as, and for the purpose, hereinbefore described.

3. The combination, in a lathe, of a slide-rest, a cutter or tool frame and a guide-frame with a slider forming a lever both frames being pivotally mounted on the transverse slide of said slide-rest, bands connected at their ends to said cutter or tool frame and said guide-frame respectively, tangent wheels and screws for adjusting said bands, a pivot-pin on said slider, and means for connecting said pivot-pin to the longitudinal slide of the slide-rest, substantially as, and for the purpose, hereinbefore described.

4. The combination, in a lathe, of a slide-rest, a cutter or tool frame and a guide-frame with a slider forming a lever both frames pivotally mounted on the transverse slide of said slide-rest, gearing connecting said cutter or tool frame and said lever, brackets mounted on the longitudinal slide of said slide-rest, a T-piece having its cross-arms adjustably secured in said brackets, a block adjustably secured on the stem of said T-piece, and a pivot-pin on the slider and working in said block, substantially as hereinbefore described.

5. The combination, in a lathe, of a slide-rest, a bush or stem mounted in the transverse slide of said slide-rest, a cutter or tool holder rotatably mounted on the end of said bush or stem, a cutter-spindle pivotally mounted in said holder, a spindle journaled in said bush or stem, gearing connecting said cutter-spindle and the spindle in said bush or stem, gearing for driving the spindle in said bush or stem, a guide-frame pivotally mounted on said transverse slide, a slider in said guide-frame, gearing connecting said cutter or tool holder with said guide-frame, and a pivot-pin on the slider adjustably connected to the longitudinal slide of said slide-rest, substantially as, and for the purpose, specified.

6. The combination, in a lathe, of a slide-rest, a cutter or tool holder pivotally mounted on the transverse slide of said slide-rest, a hub on said holder, a sleeve pivotally mounted on said transverse slide, rings rotatably mounted on said sleeve, teeth formed on said rings, tangent-screws journaled in a bracket on said sleeve, flexible bands each connected at one end to one of said rings and at the other to the hub of said cutter or tool holder, a guide-frame mounted on said sleeve, a slider in said guide-frame and a pivot-pin on said slider and adjustably secured to the longitudinal slide of said slide-rest substantially as described.

7. The combination, in a lathe, of a slide-rest, a cutter or tool frame and a guide-frame with a slider forming a lever, both frames pivotally mounted on the transverse slide of said slide-rest, a sleeve rigidly attached to said guide-frame, a split collar encircling said sleeve and anchored to said transverse slide, a clamping-screw uniting the ends of said split collar, gearing connecting said cutter or tool frame and said sleeve, and a pivot-pin connecting said slider and the longitudinal slide of said slide-rest, substantially as, and for the purpose specified.

In testimony whereof I have hereunto set my hand in presence of two subscribing witnesses.

HUGH CECIL ROBINSON.

Witnesses:
W. M. HARRIS,
WALTER J. SKERTEN.